United States Patent [19]

Mandt

[11] Patent Number: 4,596,658
[45] Date of Patent: Jun. 24, 1986

[54] SEQUENCING BATCH REACTOR DECANTER SYSTEMS

[76] Inventor: Mikkel G. Mandt, 2309 Grand Blvd., Cedar Falls, Iowa 50613

[21] Appl. No.: 575,019

[22] Filed: Jan. 30, 1984

[51] Int. Cl.[4] .............................................. C02F 3/12
[52] U.S. Cl. ...................................... 210/626; 210/607; 210/620; 210/629; 210/195.3; 210/220; 210/540
[58] Field of Search .............. 210/626, 627, 628, 629, 210/195.3, 195.4, 220, 801, 802, 521, 522, 540, 607, 620

[56] References Cited

U.S. PATENT DOCUMENTS

| | | |
|---|---|---|
| 2,772,783 | 12/1956 | Ludi .................................... 210/540 |
| 2,863,565 | 12/1958 | Quast ................................... 210/540 |
| 3,275,157 | 9/1966 | Stamps ................................. 210/521 |
| 3,447,688 | 6/1969 | MacCabe ............................ 210/540 |
| 3,516,545 | 6/1970 | Larkin ................................. 210/220 |
| 4,024,060 | 5/1977 | Hughes ............................... 210/626 |
| 4,247,312 | 1/1981 | Thakur ................................ 210/522 |
| 4,277,341 | 7/1981 | Wise ................................... 210/150 |
| 4,396,508 | 8/1983 | Broughton .......................... 210/802 |
| 4,455,239 | 6/1984 | Morrow .............................. 210/220 |
| 4,468,327 | 8/1984 | Brown ................................. 210/626 |

Primary Examiner—Ernest G. Therkorn
Attorney, Agent, or Firm—Fitch, Even, Tabin & Flannery

[57] ABSTRACT

Methods and apparatus for decanting clarified waste water in a sequencing batch reactor or the like.

12 Claims, 5 Drawing Figures

SEQUENCING BATCH REACTOR DECANTER SYSTEMS

The present invention is directed to methods and apparatus for waste water treatment, and more particularly, is directed to methods and apparatus for decanting clarified waste water from waste water treatment systems such as sequencing batch reactor waste water treatment systems.

Sequencing batch reactors are conventionally utilized for waste water treatment to provide a predetermined sequence of treatment conditions. In this regard, waste water may typically be introduced into a sequencing batch reactor treatment system and subjected to extensive mixing and aeration for a predetermined period of time to provide biological oxidation or consumption of waste water components. The mixing and aeration may subsequently be stopped and the waste water maintained in a quiescent state to permit waste water solids, including microbiological treatment organisms, to settle in the reactor. A clarified portion of the treated waste water may be removed from the upper portion of the reactor, which in turn may be conducted to subsequent treatment and discharge steps. Additional waste water which is to be treated may then be introduced into the sequencing batch reactor, and the cycle repeated. Although sequencing batch reactor systems have significant potential as efficient, flexible and economical waste water treatment systems, conventional systems for removing the clarified waste water in such systems have various disadvantages and have imposed significant limitations on the utility of sequencing batch reactor systems. For example, conventional decanting apparatus has been utilized which is positioned above the water level of the reactor. Such decanting apparatus is subject to freezing in cold weather, and may be adversely affected in its operation by scum accumulation on the surface of the biological reactor, which may freeze to impede free liquid transfer or operation of the decanting apparatus. Other difficulties include a tendency for the mixed liquor solids in the reactor to migrate into the decanter during the aeration and mixing reaction period of operation, such that the initial portion of the decanted liquid contains a significant amount of waste water solids which must be rerouted to the input end of the reactor to avoid contamination of the clarified discharge liquid. The presence of even relatively small amounts of mixed liquor solids which include active treatment microorganisms concentrated in the reactor tankage, may adversely affect the effluent quality goals for the treatment system and may periodically overwhelm downstream disinfection or other treatment operations.

Methods and apparatus for decanting clarified effluent in waste water treatment systems such as sequencing batch reactors which are substantially immune to climatic conditions, and simple and effective in operation, would enhance the utility of sequencing batch reactors for waste water treatment. Accordingly, it is an object of the present invention to provide such improved methods and apparatus and sequencing batch reactor systems which utilize such methods and apparatus. These and other objects of the invention will become more apparent from the following detailed description and the accompanying drawings.

DESCRIPTION OF THE PREFERRED EMBODIMENTS

Generally in accordance with the present invention, methods and apparatus are provided for decanting an upper clarified layer of a body of waste water having a lower layer of stratified waste water solids therein.

In accordance with method aspects of the present invention, waste water to be treated may be introduced into a mixed liquor treatment zone containing waste solids, including treatment microorganisms. This waste water mixed liquor may be mixed and aerated for a predetermined period of time to reduce the biological oxygen demand of the waste water, and the mixed liquor may be subsequently maintained in a quiescent state for a settling period to form a clarified upper layer and a stratified lower layer containing waste solids. Typically the mixing and aeration time period may be in the range of from about 1 hour to about 5 hours, and preferably from about 2 to about 4 hours. The settling, quiescent period will typically be less than about 2 hours, and preferably in the range of from about 30 minutes to about 90 minutes. In an important aspect of such methods, a predetermined portion of the upper clarified layer may be removed from the treatment zone by withdrawing clarified water through a decanting orifice zone having a length to width ratio of at least about 25, and preferably at least about 75, which is oriented substantially horizontally along its length in the treatment zone. The width of the decanter orifice zone should best be in the range of from about 1 to about 5 inches, preferably from about 1.5 to about 3 inches. The rate of withdrawal of clarified waste water through the horizontally extending submerged decanting orifice zone should not exceed about 300 gallons per minute per lineal foot along its horizontal length, and preferably should be less than about 200 gallons per minute per lineal foot along its length in the horizontal direction. By horizontally extending the withdrawal zone and thereby avoiding a localized or "point" withdrawal zone, flow patterns incident to the withdrawal of liquid which disturb and mix the settled solids into the upper clarified liquid being withdrawn are avoided.

The decanting orifice zone should be sufficiently long to permit withdrawal of a sufficient total volume of clarified water from the treatment zone to reduce the height of the surface of the treatment zone a predetermined distance in the range of from about 1 to about 6 feet, and preferably in the range of from about 2 to about 5 feet, within an hour, and more preferably in less than about 45 minutes.

The decanting step may be controlled by opening and closing a single valve and permitting hydraulic pressure to force the clarified liquid through the horizontally extended decantation orifice. However, various aspects of the present disclosure further comprise particularly preferred methods for controlling the decanting step. In this regard, such control methods may comprise the steps of entrapping air in a fluid trap zone downstream of the extended inlet zone while the liquid is above the horizontally extended inlet orifice, and establishing a hydraulic back pressure in the fluid trap zone corresponding to the height of the liquid above the extended inlet orifice. The decantation step may be initiated by removing the air from the fluid trap zone to establish a continuous liquid column in the hydraulic trap zone, as will be more fully explained hereinafter.

As also indicated, various apparatus aspects of the present invention comprise a sequential batch reaction tank, and tank inlet means for introducing waste water to be treated into the tank, together with horizontally extended decantation means for withdrawing liquid from the tank positioned within the tank at a predetermined height substantially corresponding to a minimum predetermined water level decantation height. The horizontally extended decantation means desirably defines a horizontally extended orifice having a width in the range of from about 1 to about 5 inches and preferably in the range of from about 1.5 inches to about 3 inches, and a length extending horizontally in the tank of at least about 25 and preferably at least about 75 times its width. The orifice may further desirably have a depth extending in the direction of influent liquid flow of at least about 4 inches, and more preferably in the range of from about 4 to about 18 inches, with upwardly directed orifice walls oriented in a direction in the range of from about 45 to about 90, and preferably at least about 60 degrees to the horizontal direction to define a laminar upstanding inlet orifice surface which permits settling of suspended waste liquor from the inlet orifice. The decantation means will further include a discharge outlet for discharging fluid from the tank which has passed through the horizontally extended decantation orifice means, and means for controlling passage of liquid through the discharge means.

As previously indicated, such control means may simply comprise a hydraulic valve in the discharge outlet, or may preferably comprise an air trap configuration which provides for automatic overflow control. In this latter regard, the decanter apparatus may further comprise means defining a hydraulic trap for developing an opposing hydraulic pressure to the hydraulic pressure established by the water level in the tank above the horizontally extended decanter inlet orifice, together with means defining an air retention zone intermediate the hydraulic trap and the horizontally extended inlet orifice. The preferred apparatus will further include means for releasing air retained in the air retention zone to break the hydraulic trap and permit discharge of water from the tank under hydraulic pressure differential including that established between the water level in the tank and the horizontally extended discharge orifice.

The relative volumes of the upstanding inlet orifice and the air retention manifold may desirably be such that the inlet orifice volume may accommodate a hydraulic pressure up to that corresponding to a water level in the tank of a predetermined height above the minimum decantation level and such that liquid will pass through the orifice into the air retention zone and through the trap zone upon exceeding the predetermined level in the tank. This relative volume ratio will depend upon the displacement volume in the hydraulic trap, and upon the amount of compression of the air in the air retention zone, as will be more fully described with respect to the sequential batch reaction systems of FIGS. 1-5.

Figure 1:
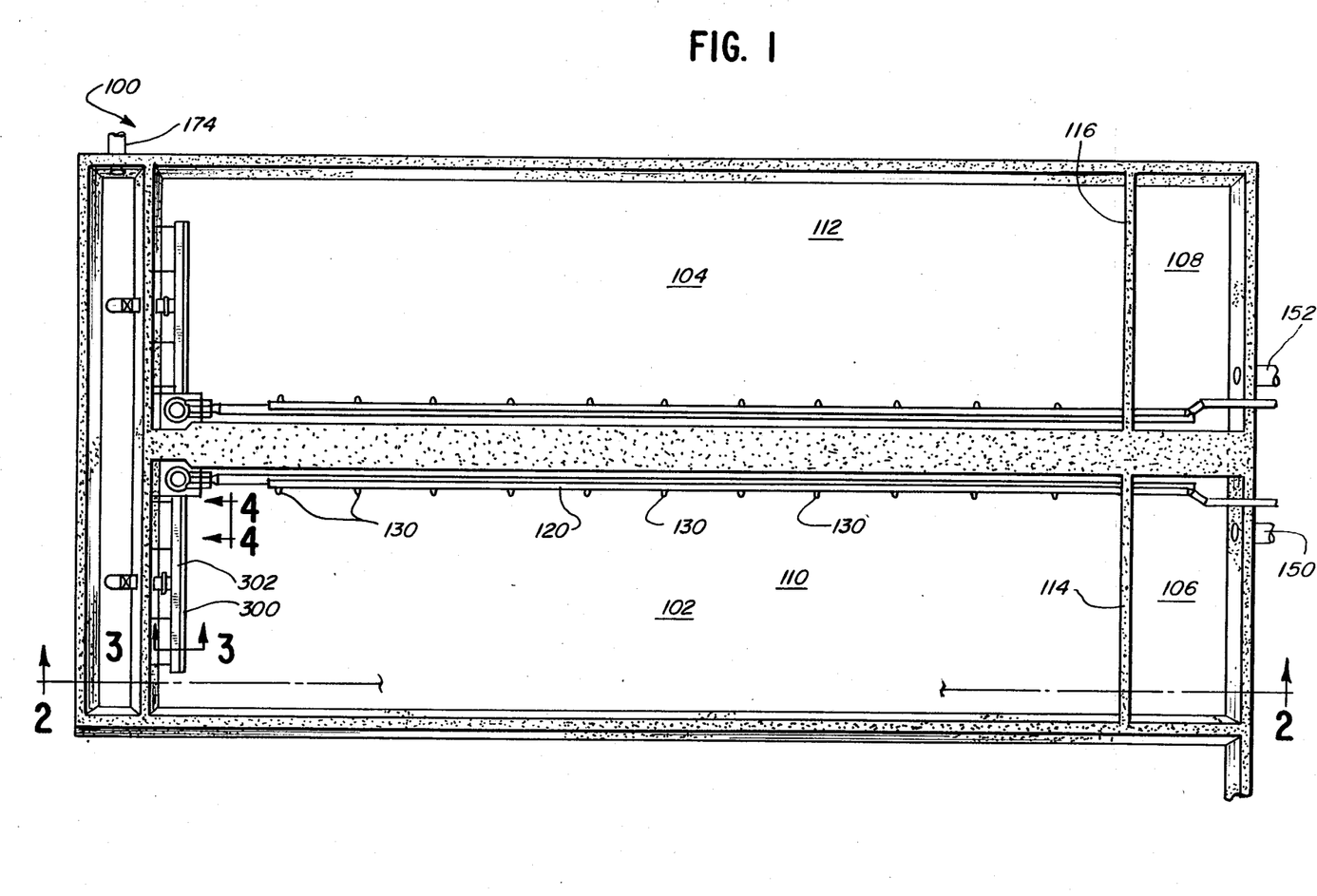
FIG. 1 is a plan view of a dual treatment reservoir sequencing batch reactor system utilizing an embodiment of subsurface decanter apparatus in accordance with the present invention.

Illustrated in FIG. 1 is a sequencing batch reactor 100 for waste water treatment, which comprises two separate substantially identical waste water treatment tanks 102, 104. Waste water to be treated in the sequencing batch reactor 100 may be introduced into the respective input chambers 106, 108 through waste inlets 150, 152. The input chambers 106, 108, which are separated from their respective aeration treatment tanks 110, 112 by baffles 114, 116 which form underflow weirs providing for fluid transfer to the respective aeration treatment chambers 110, 112. The influent waste liquid to be treated may be introduced periodically, such as with the filling portion of a sequential batch reaction treatment cycle, or may be introduced continuously into the input zone 106. Particularly in the latter case, the baffle 114, and its location opposite the decanting apparatus 302 which will be subsequently described, prevents the continuous introduction of waste liquid from disturbing the clarified upper layer of liquid which is established at the decanting apparatus during the quiescent and decanting periods of the operation of the sequential batch reactors 102, 104. Because the sequencing batch reactor tanks 102, 104 are substantially identical, further description will be limited to the treatment tank 102, which is shown in cross section in FIG. 2.

Figure 2:
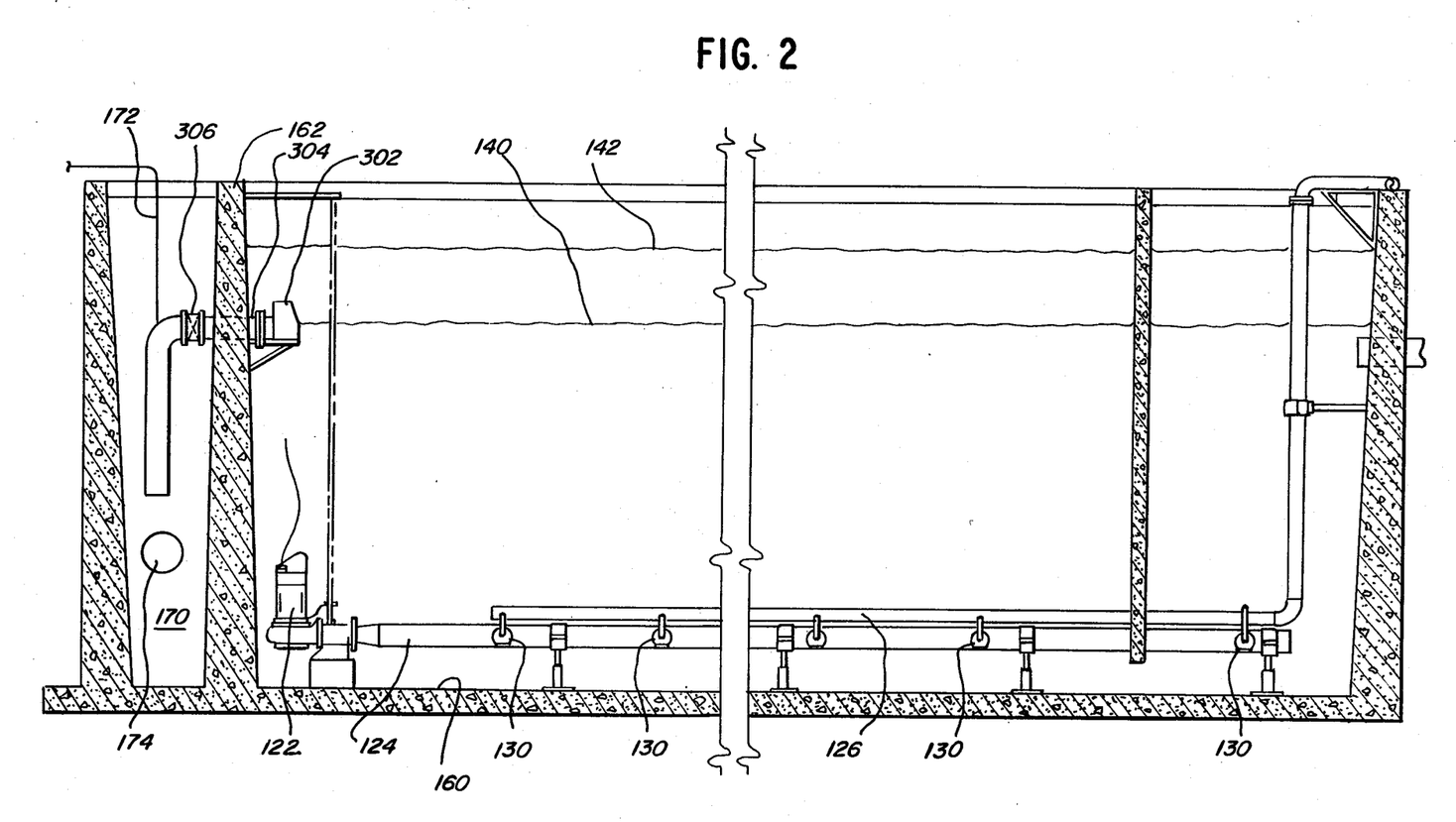
FIG. 2 is an enlarged cross sectional side view, partially broken away, of the sequencing batch reactor of FIG. 1 taken through line 2—2.

The treatment tank 102 comprises means for mixing the waste water liquids in the tank, and for aerating the liquids in the tank. In the illustrated embodiment 102, the mixing and aerating functions are carried out by jet aeration apparatus 120, which comprises a waste water pump 122 for introducing a pressurized stream of waste water drawn from the tank 102, into a waste water manifold 124. Pressurized air may be introduced into a pressurized air manifold 126 by means of a blower (not shown) in accordance with conventional practice. The pressurized liquid and the air may be combined and discharged into the tank 102 through a plurality of nozzles, which in the illustrated embodiment are regularly disposed at uniform intervals along the pressurized fluid and pressurized air manifold 124, 126. The pressurized liquid or pressurized liquid and air stream which is discharged from the nozzles 130, is directed toward the opposite wall of the tank 102, and may be directed downwardly at a slight angle in order to sweep across the bottom of the tank 102 to thoroughly mix the tank.

The hydraulic retention time of the tank 102 for typical domestic sewage treatment may nominally be in the range of from about 12 hours to about 48 hours. Desirably, the tankage volume may approximate the total daily treatment volume to be handled by the plant. For example, for a waste water treatment system designed to treat 200,000 gallons of waste water per day, the treatment volume of the sequencing batch reactor would similarly have a volume of approximately 200,000 gallons, so that the hydraulic retention time is approximately 24 hours. Because the solids are retained within the treatment basin, the solids retention time is substantially greater than the hydraulic retention time.

The long retention time will permit production of nitrifying bacteria, which are capable of oxidizing ammonia nitrogen to the nitrate form. Because the aeration system blowers are left off during a period of the treatment cycle, the microorganisms which utilize carbon sources will use the nitrate as an oxygen source, thereby converting the nitrate nitrogen to nitroqen gas, resulting in removal of nitrogen from the waste water before it is decanted. The settling period may be relied on to provide most of the denitrification treatment time. There may be biological advantages to filling of the treatment tank without introduction of oxygen. By selecting proper operating conditions, filamentous organisms which are poor settlers may be discouraged, and the type of microorganisms present in the treatment zone may be selectively controlled by the cycling.

In accordance with conventional practice in the operation of sequential batch reactors, the settled sludge may be periodically recovered by removal from the bottom of the treatment basin by a suitable piping system (not shown). Such removal may be carried out in small amounts with each treatment cycle, or larger amounts at more extended intervals.

At the discharge end of the sequencing batch reactor 102 there is provided a submerged discharge manifold system 300 which is utilized to periodically remove a predetermined amount of clarified water from the treatment basin 102. The submerged decanter manifold system 300 forms an important part of the present invention, and various aspects of the illustrated decanter systems are illustrated in more detail in FIGS. 3 and 4.

As shown in FIGS. 1 and 2, the decanter manifold extends horizontally along the discharge wall of the tank 102, and is mounted at a predetermined height along the discharge wall which is related to the desired lower liquid level 140 of the waste water at the lowest level in the treatment cycle. In the illustrated embodiment, the lower water level of the sequencing batch reactor tank 102 may be approximately 13 feet above the bottom 160 of the tank 102. The nominal upper liquid level 142 of the sequencing batch reactor tank 102 in the illustrated embodiment may be approximately 3 feet higher, or 17 feet above the bottom 160 of the tank. Accordingly, it will be appreciated that the decanter system 300 is substantially submerged during operation and treatment of the waste water in the tank 102 under mixing and aeration conditions which thoroughly mix the mixed liquor solids throughout the waste liquid in the tank 102.

It is an important feature of the decanter 302 that waste water solids distributed throughout the mixed liquor during the mixing and aeration portion of the treatment cycle are not permitted to remain in the inlet orifice of the decanter. In this regard, the solids settle in the upstanding laminar flow inlet to the interior of the decanter manifold when the waste liquid is maintained in a quiescent condition, avoiding any discharge of the solids through the decanter during the decantation step.

The illustrated decanter system 300 comprises the decanter manifold 302 which, as will be explained in more detail hereinafter, forms an input weir for connecting with an interior manifold zone. The submerged decanter system 300 further comprises an outlet conduit 304 from the interior manifold zone of the submerged decanter manifold 302, which extends through the downstream outlet wall 162 of the sequential batch reactor tank 110, into the clarified effluent outflow reservoir 170. The outflow conduit 304 bends within the reservoir 170 to extend downwardly a significant distance, such as a distance in the range of from about 0 to about 4 feet, to provide a siphoning effect for removal of clarified effluent during the decanting operation of the system. A disinfectant solution such as a chlorine containing solution may be introduced into the discharge effluent through conduit 172. An intermediate valve 306 controls the flow through the conduit 304. When it is desired to discharge clarified liquid from the tank 102, the valve 306 may be opened. The valve may be closed when it is desired to fill the tank 102.

Figure 3:
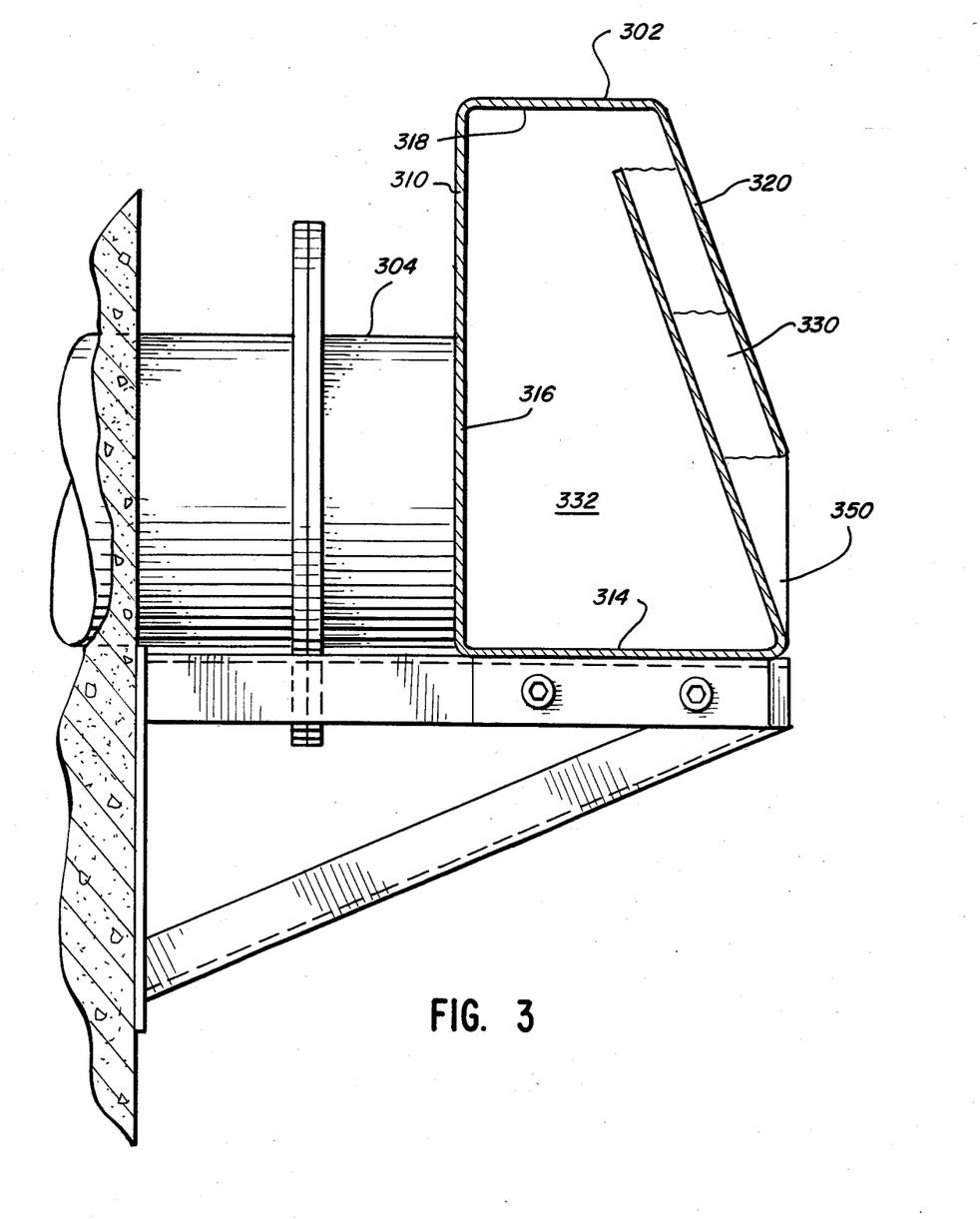
FIG. 3 is an enlarged cross sectional side view of the subsurface decanter apparatus of the sequencing batch reactor system of FIG. 1 taken through line 3—3.

Illustrated in FIG. 3 is a cross sectional view, taken through line 3-3 of FIG. 1, of the extended laminar decanter manifold 302, together with outlet conduit 304. As previously indicated, the extended laminar decanter manifold 302 functions to prevent input or inflow of waste liquor solids into the discharge system. In this connection, the illustrated decanter manifold 302 functions to prevents entry and retention of waste liquor solids in the decanter system during turbulent reaction periods of the batch reaction cycle, permits settling of solids from the inlet orifice during the settling period, and functions to remove clarified effluent from the reaction tank zone without disturbing the settled waste liquor solids, by distributing the area of liquid withdrawal from the system. As illustrated in FIG. 3, the extended laminar decanter manifold 302 is formed from a continuous sheet of a suitable material such as glass fiber reinforced organopolymeric matrix, such as polyester matrix. The sheet 310 has a generally downwardly extending front wall 312, a horizontally extending bottom wall 314, an upwardly extending front wall 316, a top wall 318, and a downwardly extending front wall 320 which overlaps the front wall 312 to form a laminar inlet zone 330, and an interior conduit zone 332 within the sheet 310. In the illustrated embodiment 302, the longitudinal ends are sealed or closed by means of sheets 350 integral with the sheet 310, such that the only passageway into the interior conduit zone 332 of the extended laminar manifold 302 is provided by the slot conduit defined by the walls 312, 320. In the illustrated embodiment, the walls 312, 320 are separated by a distance of about 2 inches, and the walls 312, 320 parallel each other for a distance sufficient to provide an upwardly directed conduit height of approximately 10 inches between the lower edge of wall 320 and the upper edge of wall 312. The illustrated manifold 302 is 20 inches high, 12 inches wide at its base, and is shown approximately to scale in FIG. 3. The internally formed conduit zone 332 of the extended laminar decanter manifold 302 is in full communication with conduit 304, which is integrally formed therewith of a suitable material such as glass fiber reinforced polyester matrix. The conduit 304 forms the only outlet from the decanter manifold 302, which in the illustrated embodiment is otherwise hermetically sealed.

Figures 4, 5:
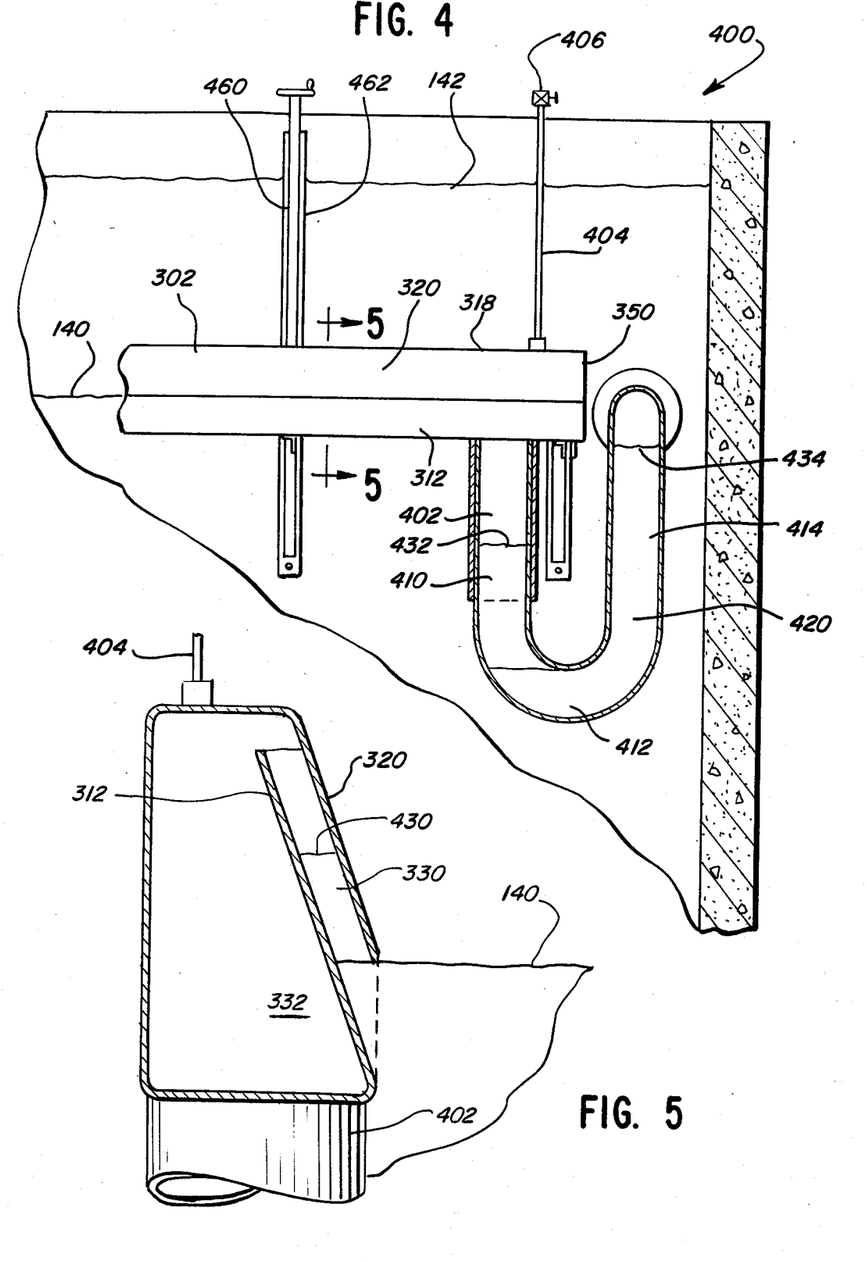
FIG. 4 is a side elevational view of an alternative embodiment of the decanter apparatus for the sequencing batch reactor system of FIG. 1, as if taken through line 4—4 of FIG. 1.
FIG. 5 is a cross sectional view of the decanter apparatus of FIG. 4, taken through line 5—5.

Illustrated in FIG. 4 is another particularly preferred embodiment of decanting apparatus in accordance with the present invention, which utilizes an air-filled mode of operation to control the decanting operations. In the air filled mode of operation, which is the preferred mode, air is provided in the decanter manifold, thereby interrupting the continuous water column which would otherwise be provided, and preventing any siphon effect at the bottom of the water level. Air is then trapped in the decanter during the reaction portion of the treatment sequence and the settle portion of the treatment sequence, excluding all liquid and solids from the decanter. To initiate the decant operation of the cycle, the air release solenoid valve is opened, thereby purging the decanter of air and initiating decanter siphoning action. The solenoid may then be closed. The siphoning action pulls the liquid level down until air is drawn into the decanter opening, thereby breaking the siphon operation. The decanter is thus prepared for repetitive cycles of operation. The utilization of the siphon in the air filled mode eliminates expensive large diameter liquid flow control valves, and requires only a small solenoid valve for controlling the operation of the system. By proper design of the decanter geometry, it is possible to incorporate an automatic bypass feature. In this regard, if the tank liquid reaches the high water level prior to the initiation of a decant cycle (which may be on a clock or timed sequence), liquid will flow over the external decant weir at the rate of inflow to the tank, automatically bypassing clarified effluent. This feature is desirable in continuous feed single tank plants. Specific geometric relationships and volume ratios should be maintained within the decanter and siphon arrangement to effect proper operation. In this regard, while the apparatus of FIG. 3 utilizes a relatively large hydraulic valve 306 to control the decanting discharge from the system, the apparatus illustrated in FIG. 4 utilizes a different control system, and provides added features such as automatic overflow control for the sequential batch reaction treatment system, as will be explained in more detail hereinafter.

As illustrated in FIG. 4, the embodiment 400 does not include a conduit such as conduit 304 (FIG. 3) projecting directly from the back wall 316 of the decanter manifold conduit 332. Instead, a discharge conduit 402 is provided which projects downwardly from the bottom wall 314 of the extended decanter manifold 302, and which is in direct fluid communication with the interior cavity 332 of the decanter 302. The illustrated conduit 402 extends downwardly a distance sufficient to establish a hydraulic head at least equivalent to the maximum head difference between the high and low liquid levels 140, 142 for the reaction tank, and extends upwardly as illustrated in FIG. 4 to connect with a conduit passing through the wall 162 of the tank, in a manner such as illustrated in FIG. 2. The discharge on the downstream side of wall 162 may be curved downward and extended as shown in FIG. 2, although such discharge conduit need not have a valve such as valve 306 to control the timing of the decant discharge.

In order to control the decanting discharge and the operation of the extended laminar inlet manifold 302 is provided with air discharge pipe 404 which communicates through the top wall 318 of the decanter manifold 302. The air conduit extends substantially above the upper liquid level 142 of the sequential batch treatment reactor system, and terminates in a solenoid valve 406 which is normally closed. Through the operation of the valve 406 and the conduit 404, which may be relatively small in diameter (e.g., 2 inches in inside diameter), the decanting operation may be controlled without the necessity for utilizing relatively large fluid valves such as valve 306 (FIG. 2). In this regard, the operation of the system 400 will now be described beginning with the initiation of a cycle at the lower water level 140. At the beginning of the cycle, with the previous decanting operation having lowered the water level in the tank by removal of clarified effluent, the liquid level 140 will qenerally be approximately at the lower edge of the front wall 320 of the decanter manifold 302, as shown in FIG. 5. At this time, the interior manifold conduit 332 formed by the manifold 302 will be substantially filled with air, and the valve 406 will be opened briefly to insure that the interior volume contains air. It will be appreciated that the liquid level within the conduit volume 332 may be below the level 140 of the treatment zone, because of its ability to drain through the discharge pipe 402, and by virtue of the effects of inertia from the discharge of the previous decanting operation through the pipe 402. The valve 406 is then closed, thereby confining the air within the volume 332. The sequential batch reactor tank 102 is subsequently filled with influent to be treated, thereby raising the water level above the lower lip of the front wall 320. As the water level rises, a hydrostatic pressure head is developed which forces the liquid to rise within the inlet slot 330 of the manifold 302.

Because the air within the interior 332 of the decanter manifold 302 is sealed therein, as the pressure increases with rising level of the surface of the waste water liquid in the treatment tank, the liquid in the downwardly directed portion 410 of the hydraulic trap 420 is downwardly displaced to provide a counter balancing hydraulic head in the opposite side 414 of the hydraulic trap 420. An intermediate water level 430 is shown in FIG. 5 within the slot inlet opening of the decanter manifold, for a condition where the treatment water level within the reaction tank has risen approximately half way from its lower level 140 to its upper design level 142. Similarly, a liquid level 432 is shown for this intermediate condition, within the downwardly directed portion 410 of the hydraulic trap 420. It will be appreciated that the hydraulic difference between the liquid level 432 in the conduit portion 410, and the liquid level 434 in the upwardly directed conduit portion 414 will generally correspond to the hydraulic difference between the water level in the tank, and the lower water level 140 of the sequential reactor. When the liquid within the reactor reaches its design upper level 142, the level of the liquid within the slot opening 330 of the decanter manifold 302 will reach the upper lip of the wall 312. If the water in the tank rises substantially above the level 142, such as through control failure, or storm surges, or other causes, the liquid from the tank will pass through the slot, and flow over the upper lip of the inner wall 312 into the interior volume 332 of the decanter manifold 302. It will then be conducted through the trap 420 and discharged into the discharge reservoir 170. In this manner, automatic overflow or surge protection is provided for the system.

When it is desired to initiate a decanting operation of clarified effluent after an appropriate settling time, the valve 406 is opened to release the pressurized air within the manifold chamber 332. Because the valve 406 is located above the upper water level 142, liquid is prevented from reaching the valve, but the manifold volume may be substantially evacuated of air. Upon release of the air, the hydraulic potential difference maintained between the portion 410 and the portion 414 of the hydraulic trap 420 can no longer be maintained. Because it is this hydraulic difference which prevents outflow from the system, upon opening of the valve 406 to remove the air within the decanter manifold, the decant cycle is automatically initiated. The decanting discharge will continue, driven by the hydraulic potential difference between the liquid in the tank and the lower design level 140, until the liquid level reaches the lower lip of the front wall 320 of the decanter manifold.

At this point, air may enter the manifold, and the decanting operation ceases.

In the illustrated embodiments, the flow through the decanter system is assisted by the siphoning action of the downwardly directed conduit on the discharge side of the wall 162. Accordingly, the fluid velocity within the conduit may be relatively high (e.g., for a 12 inch diameter discharge conduit, the velocity of discharge may be 4,000 gallons per minute). However, the rate of withdrawal from the treatment tank will typically be in the range of from about 100 to about 200 gallons per minute per lineal foot of the horizontally extended decanter inlet orifice 330. In this manner, the clarified upper liquid layer is preferentially removed without creating localized flow patterns or areas of turbulence induced by a concentrated zone of fluid removal, which may cause mixing of the settled solids or discharge of the solids with the clarified effluent.

It will also be appreciated that the decantation may be initiated at any height substantially above the lower design level 140, and need not rise to the upper design level 142. In this regard, during periods of low influent flow, it may be desirable to operate the system on a timed basis, during which the liquid level may not rise to the maximum treatment height.

It will also be appreciated that the range of treatment height may be varied by variation in the placement and other design parameters of the decanter manifold system, which may be permanently installed or which may be installed so that it may be variably operated. In this connection, as illustrated in FIG. 4, the decanter manifold may be mounted such that it may be raised and lowered to permit variation in the parameters of operation of the system. Such variation may be readily accomplished by providing a telescoping (but otherwise sealed) conduit assembly as shown in FIG. 4. Upon raising and/or lowering the decanter manifold, such as by hand cranks 460 which raise or lower the manifold along a mounting track 462, the conduit segment 410 may telescope to accommodate the vertical displacement of the decanter manifold. Of course, it will be appreciated that the decanter manifold should be maintained in a substantially horizontal, level position.

While the present invention has been described with respect to particular embodiments of apparatus and methods, it will be appreciated that various modifications and adaptations may be made based on the present disclosure and are intended to be within the scope of the accompanying claims.

What is claimed is:

1. A method for treating waste water to reduce its solids content and biological oxygen demand, comprising the steps of
    introducing waste water to be treated into a waste liquid treatment zone containing waste solids including treatment microorganisms,
    providing at a predetermined position in the upper portion of said waste liquid treatment zone a submerged, upwardly directed decanting orifice zone extended substantially horizontally along the direction of its length and communicating at its lower end with wastewater in the waste liquid treatment zone, and having an orifice length to width ratio of at least about 25, an orifice width of from about 1 to about 5 inches, and a depth along the direction of liquid flow of at least about 4 inches,
    providing an air retention zone at the upper end of said decanting orifice zone,
    providing a discharge conduit in communication with said air retention zone,
    mixing and aerating the waste liquid in the treatment zone for a predetermined period of time to reduce the biological oxygen demand of the waste water while confining air at superatmospheric pressure in said air retention zone to restrain the discharge of waste water through said orifice zone,
    subsequently maintaining the waste liquid in a quiescent state in the treatment zone for a settling period to form a clarified upper layer and a stratified lower layer containing waste solids while confining air at superatmospheric pressure in said air retention zone to restrain the discharge of waste water through said orifice zone and permitting waste solids to settle from said orifice zone, and
    removing a predetermined portion of the clarified upper layer from the treatment zone by discharging clarified water through said submerged horizontally extended decanting orifice zone without creating locallized turbulent flow patterns which cause mixing of the settled solids and discharge of the solids with the clarified effluent and wherein the rate of withdrawal of clarified waste water through the horizontally extended submerged decanting orifice zone of less than about 300 gallons per minute per lineal foot along its horizontal length.

2. A method in accordance with claim 1 wherein the width of the orifice zone is in the range of from about 1.5 to about 3 inches, a length to width ratio of at least about 75 and wherein the horizontally extending length of the orifice zone is at least about 10 feet.

3. A method in accordance with claim 1 wherein the rate of withdrawal is less than about 200 gallons per minute per lineal foot along the horizontal dimension of the decanter inlet orifice.

4. A method in accordance with claim 1 wherein said clarified water is removed from the treatment zone through the horizontally decanting orifice zone at a sufficient rate to reduce the height of the surface of the treatment zone a predetermined distance in the range of from about 1 to about 6 feet in less than 2 hours.

5. A method in accordance with claim 1 wherein the discharge step is controlled by opening a discharge valve in said discharge conduit and permitting hydraulic pressure to force the clarified liquid through the horizontally extended decantation orifice, through the air retention zone, and through the discharge conduit.

6. A method in accordance with claim 1 further comprising the steps of establishing a hydraulic back pressure in a fluid trap zone in said discharge conduit corresponding to the height of the liquid above the extended inlet orifice, and initiating clarified liquid discharge by removing the air from the air retention zone to establish a continuous liquid column in the hydraulic trap zone.

7. A method in accordance with claim 6 wherein the maximum hydraulic back pressure corresponds to a predetermined maximum upper height of liquid in the treatment zone.

8. A sequencing batch reactor for waste water treatment comprising a reaction tank, reaction tank inlet means for introducing waste water to be treated into the tank, aeration means for aerating waste water in the reaction tank and horizontally extended decantation means for withdrawing liquid from the tank, said horizontally extended decantation means being positioned within the tank at a predetermined height substantially corresponding to a minimum predetermined water level decantation height, said horizontally extended decantation means comprising a horizontally extended orifice having a width in the range of from about 1 to about 5 inches, a length extending horizontally in the tank of at least about 25 times said width, and a depth extending upwardly in the direction of influent liquid flow of at least about 4 inches, the walls of said orifice being oriented in an upward direction at an angle in the range of from about 45 to about 90 degrees to the horizontal direction, to define a laminar upstanding inlet orifice which permits settling of suspended waste liquor from the inlet orifice, air retention means in communication with the upper end of said orifice for confining air at a superatmospheric pressure to prevent flow of wastewater through said decantation means, discharge conduit means in fluid communication with said air retention means for discharging wastewater through said decantation means, and control means for controlling passages of liquid through said discharge conduit.

9. Apparatus in accordance with claim 8 wherein said control means comprises an air release valve for releasing pressurized air in said air retention means to the atmosphere.

10. Apparatus in accordance with claim 9 wherein said means for controlling passage of liquid through said discharge conduit comprises a hydraulic valve in said discharge conduit.

11. Apparatus in accordance with claim 9 wherein said control means comprises means defining a hydraulic trap in said discharge conduit for developing an opposing hydraulic pressure to hydrostatic head above the minimum water level decantation height, and means for releasing air retained in said air retention means to break the hydraulic trap and permit discharge of water from the tank under influence of the hydraulic pressure differential established between the water level in the tank and the discharge orifice means.

12. Apparatus in accordance with claim 11 wherein the relative volumes of the upstanding inlet orifice and the air retention manifold are adapted to accomodate a hydraulic pressure up to a water level in the tank of a predetermined height above the minimum decantation level, and such that the liquid will pass through the orifice into the air retention zone and through the trap zone upon exceeding the predetermined level in the tank.

* * * * *